UNITED STATES PATENT OFFICE.

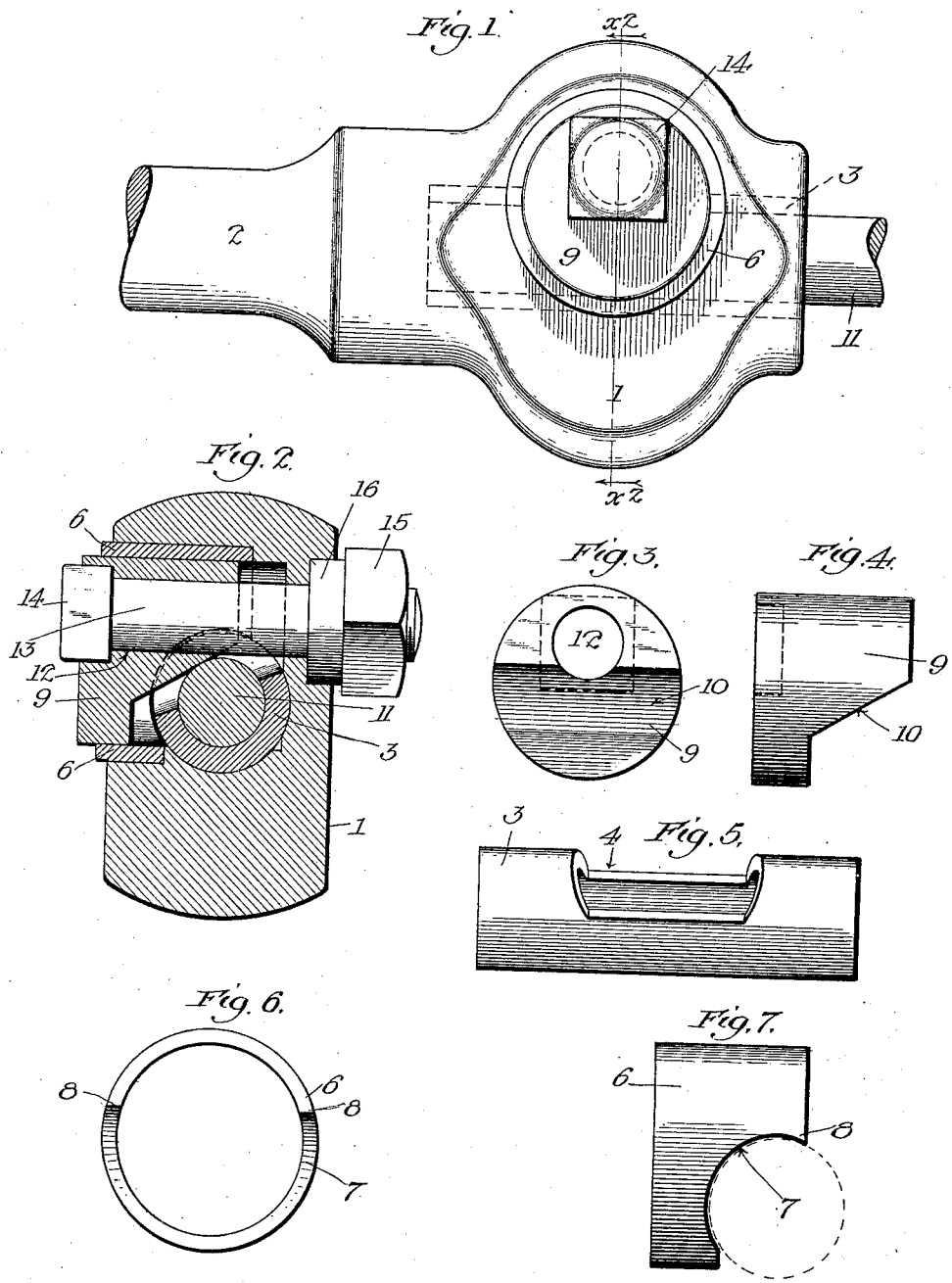

CHARLES A. HULTQUIST, OF LOS ANGELES, CALIFORNIA.

CHUCK FOR ROCK-DRILLS.

1,062,651.  Specification of Letters Patent.  Patented May 27, 1913.

Application filed May 22, 1912. Serial No. 699,064.

*To all whom it may concern:*

Be it known that I, CHARLES A. HULTQUIST, a citizen of the United States, and a resident of Los Angeles, in the county of Los Angeles and State of California, have invented a new and useful Chuck for Rock-Drills, of which the following is a specification.

This invention relates to a chuck for rock drills in which the chuck is operated by a single nut.

The objects of the invention are to provide a strong and secure fastening that will not accidentally loosen nor crystallize and break.

Another object is to remove all lateral strain from the fastening bolt and allow the wedge to take a natural seat against the drill.

Further advantages will be brought out in the following description.

Referring to the drawings:—Figure 1 is a side elevation of the chuck. Fig. 2 is a section on line $x^2$—$x^2$, Fig. 1. Fig. 3 is an end elevation of the beveled wedge. Fig. 4 is a side elevation of the wedge. Fig. 5 is a side elevation of the drill bushing. Fig. 6 is an end elevation of the wedge bushing. Fig. 7 is a side elevation of the wedge bushing.

1 designates the main body of the chuck having the usual shank 2. Extending longitudinally in the body 1 is a drill bushing 3 which, as clearly shown in Fig. 5, has a segmental cutaway portion 4. This bushing is driven tightly into place and thus prevented from turning. Arranged transversely of the drill bushing 3 is a wedge bushing 6 the walls of which have a segmental concave recess 7 with an overhanging portion 8. The recess 7 receives the drill bushing 3 and the overhanging portions 8 extend to a point below the highest face of the drill bushing 3 and thus prevent the wedge bushing 6 from accidentally dropping out when the bolt about to be described is removed. Arranged in the bushing 6 to slide transversely of the drill bushing 3 is a wedge 9, the body of which is cylindrical and provided with a wedge face 10. The cutaway portion 4 of the drill bushing 3 receives the wedge 9, as clearly shown in Fig. 2. Lying within the drill bushing 3 is the drill 11 and the wedge face 10 bears flatly against the drill so that a line of contact of considerable length is secured. The wedge 9 has an eccentric hole 12 and extending therethrough is a bolt 13. The end of the wedge 9 is recessed to receive the head 14 of the bolt 13 and the head 14 is preferably squared so that the bolt is thus held from turning around. The bolt 13 extends through the body 1 and a nut 15 is screwed on the end of the bolt. The nut 15 has a shoulder 16 which is received in the body 1 and which guides the nut. The eccentric hole 12 prevents the wedge 9 from turning, and by screwing up the nut 15 the bolt 13 draws in the wedge 9 which firmly grips the drill 11 and holds the latter firmly in its seat in the bushing 3. A slight turn of the nut 15 releases the pressure of the wedge 9 and permits the drill to be withdrawn. It is to be noted that when the wedge 9 is thrown against the drill 11, that the lateral pressure exerted against the wedge 9 is not borne by the bolt 13, but by the bushing 6, and solid body 1 of the chuck.

What I claim is:—

1. A chuck for rock drills comprising a chuck body, a drill bushing therein, said bushing having a segmental cutaway portion, a wedge bushing in said body extending transversely of the drill bushing and being formed with a segmental concave recess which receives the drill bushing, a cylindrical wedge sliding in the wedge bushing and a bolt extending through the wedge and body.

2. A chuck for rock drills comprising a chuck body, a drill bushing therein, said bushing having a segmental cutaway portion, a wedge bushing in said body extending transversely of the drill bushing and being formed with a segmental concave recess which receives the drill bushing, a cylindrical wedge sliding in the wedge bushing, a bolt extending through the wedge and body, the wedge bushing having portions which overhang the drill bushing and prevent accidental removal of the wedge bushing.

3. A chuck for rock drills comprising a body, a drill bushing in the body, the bushing having a segmental cutaway portion, a cylindrical wedge with an inclined face slidable laterally in the body and extending into the cutaway portion of the drill bushing, and a bolt extending through the wedge and body.

4. A chuck for rock drills comprising a body, a drill bushing therein having a cutaway portion, a cylindrical wedge with an eccentric hole slidable in the body transversely of the drill bushing, and a bolt through said eccentric hole and through the body.

In testimony whereof, I have hereunto set my hand at Los Angeles, California, May, 1912.

CHARLES A. HULTQUIST.

In presence of—
MARY E. BLASDEL,
MARTHA M. LANGE.

Copies of this patent may be obtained for five cents each, by addressing the "Commissioner of Patents, Washington, D. C."